United States Patent [19]
Hulbert

[11] Patent Number: 5,809,062
[45] Date of Patent: Sep. 15, 1998

[54] AMBIGUITY RESOLUTION SYSTEM IN DIRECT SEQUENCE SPREAD SPECTRUM MODULATION SYSTEMS

[75] Inventor: Anthony Peter Hulbert, Southampton, United Kingdom

[73] Assignee: Roke Manor Research Limited, Hampshire, England

[21] Appl. No.: 586,759

[22] PCT Filed: May 25, 1995

[86] PCT No.: PCT/GB95/01201

§ 371 Date: Jan. 29, 1996

§ 102(e) Date: Jan. 29, 1996

[87] PCT Pub. No.: WO95/33311

PCT Pub. Date: Dec. 7, 1995

[30] Foreign Application Priority Data

May 28, 1994 [GB] United Kingdom .................... 9410812

[51] Int. Cl.[6] .................................................. H03B 1/707
[52] U.S. Cl. .......................... 375/206; 375/208; 375/261; 375/279; 375/298; 375/325; 375/329; 375/343
[58] Field of Search ..................................... 375/200, 205, 375/206, 207–210, 261, 279, 284, 298, 324, 325, 329, 343; 329/304; 370/464, 470, 480, 491, 498, 500

[56] References Cited

U.S. PATENT DOCUMENTS 4,435,822  3/1984  Spencer et al. .
5,218,620  6/1993  Mori et al. ............................... 375/206
5,519,730  5/1996  Jasper et al. ............................. 375/260

FOREIGN PATENT DOCUMENTS 0265178  4/1988  European Pat. Off. .
0564937  10/1993  European Pat. Off. .
0577044  1/1994  European Pat. Off. .

OTHER PUBLICATIONS

C.D.'Amours et al., RAKE Receiver Structures for Differential and Pilot Symbol–Assisted Detection of DS–CDMA Signals in Frequency–Selective Rayleigh Fading Channels, IEEE Global Telecommunications Conference, vol. 3, Nov. 29, 1993, New York, pp. 1798–1802.

Primary Examiner—Stephen Chin
Assistant Examiner—Amanda T. Le
Attorney, Agent, or Firm—Hill & Simpson

[57] ABSTRACT

Coherent demodulation of phase shift keyed direct sequence spread spectrum generally needs a strong pilot to provide channel estimates and to avoid phase ambiguities. This invention relates to a novel approach in which the pilot takes the form a few known chips in every bit and in which the channel is estimated primarily by decision directed removal of the modulation and the pilot chips serve to resolve the 180 degree phase ambiguity.

9 Claims, 5 Drawing Sheets

AMBIGUITY RESOLUTION SYSTEM IN DIRECT SEQUENCE SPREAD SPECTRUM MODULATION SYSTEMS

BACKGROUND OF THE INVENTION

This invention relates specifically to direct sequence spread spectrum modulation systems and more particularly to an ambiguity resolution system therefor.

The usual form of modulation which applies in such systems, is phase shift keying. This requires a phase reference for coherent demodulation. This can be derived from the data modulated signal in a decision directed fashion but always has an associated 180 degree phase uncertainty (ambiguity).

Conventional techniques for the resolution of phase ambiguity for phase shift keying (eg binary PSK - BPSK) require the additional transmission of known pilot information. In the context of direct sequence, several methods of providing the pilot information are known.

The transmission of a separate independent pilot code is one example. This is suitable for a base station transmitter in which different signals are being transmitted to many different mobile units and a single common pilot can be shared. In this case the proportion of the total transmit power applied to the pilot can be small while the signal to interference ratio of the pilot can be high. Moreover, since the transmitted signal constitutes the sum of many signals it is already a non-constant envelope, so that the addition of a further pilot signal does not affect this. However, for a mobile transmitter, the pilot energy applies only to one signal and subtracts directly from the energy available for transmission of data. Moreover, the addition of a separate pilot would add undesirable envelope fluctuations to the transmitted signal.

The transmission of short pilot bursts-lasting several-bits at regular intervals is another example. This technique is well established for coherent modulation but does not allow for efficient averaging of the pilot with time for the time varying channel. It is also inflexible in that, as the speed of the mobile unit changes, it is not straightforward to alter the proportion of time applied to the pilot.

The transmission of individual pilot symbols at regular (or pseudo random intervals) is a further example. This method is better than the transmission of short pilot bursts in allowing for averaging of the channel conditions and is appropriate for non spread spectrum systems. However it is still rather inflexible in terms of adaptive variation of the proportion of pilot signals. Moreover, in the existing approach, the pilot symbols are used to provide the phase reference (and amplitude reference for optimum weighting of components according to maximal ratio combining in a Rake receiver) directly. This is inefficient and leads to the need for relatively high pilot energy.

SUMMARY OF THE INVENTION

The disadvantages of the above techniques are overcome by the present invention by replacing part of the modulated spread spectrum sequence with an unmodulated spread spectrum sequence. Thus the pilot component may be as little as one chip per bit, or even one chip for every several bits. This allows the pilot level to be reduced to the absolute minimum while still providing regular updates.

The signal to noise/interference ratio of the individual pilot chips is, of course, too low to provide a phase/amplitude reference. An advantage of the present invention is that decision directed channel estimation is used to provide the basic carrier reference, and the pilot chips are used merely to provide phase ambiguity resolution. Indeed, the decision directed carrier reference extraction is used to combine the pilot chips across the multipath components in order to obtain the ambiguity resolution signal.

It will also be seen that this approach leads to low complexity and allows for simple implementation of adaptive pilot level variation.

According to the present invention a direct sequence spectrum modulation system is provided. The system has means for inserting a predetermined number of chips in a bit period to form a pilot signal to resolve phase ambiguity, and channel estimation is provided by means for removing the modulation.

Various embodiments of the present invention will now be described with reference to the accompanying drawings.

DETAILED DESCRIPTION OF THE PREFERRED EMBODIMENTS

Figure 1:
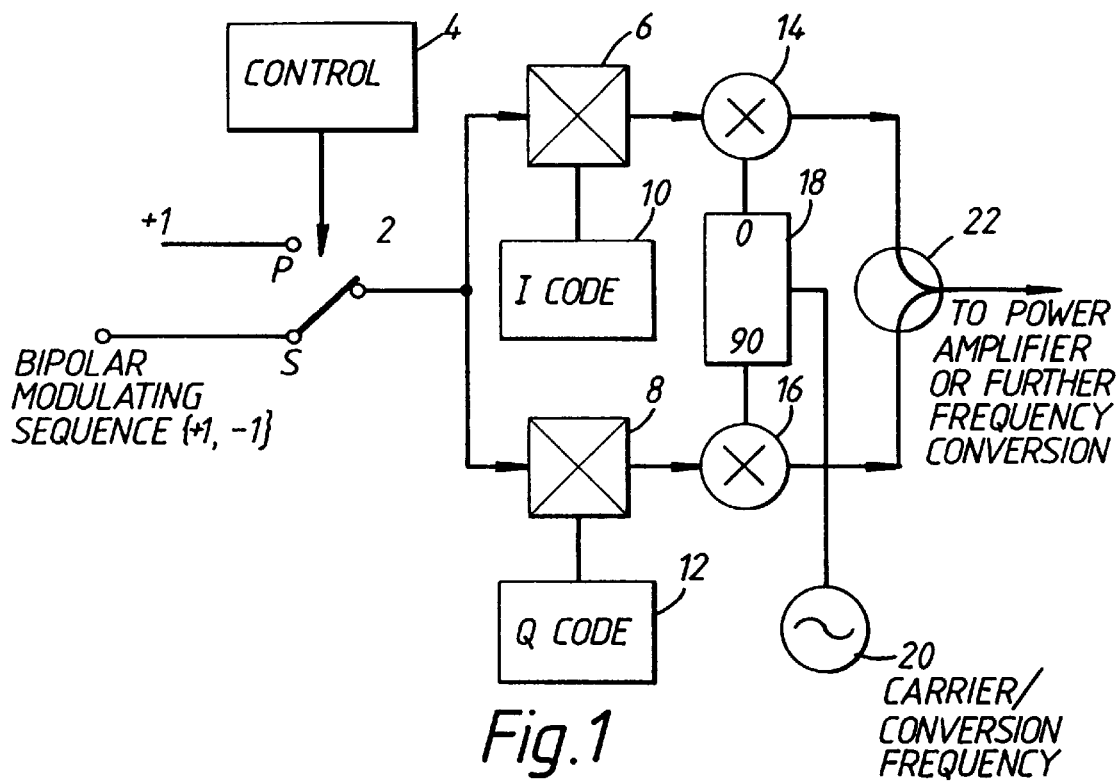
FIG. 1 shows a block diagram of a pilot chip insertion modulator of the present invention.

FIG. 1 shows the basic architecture for a pilot chip modulator. This is a conventional spread spectrum modulator as familiar to those versed in the art with an additional switch. The spread spectrum modulator comprises a switch 2 controlled by a control circuit 4. The switch 2 has two positions P and S. The switch 2 is connected to an input of a combiner circuit 6, 8 and are fed with an I code and a Q code sequence from an I code generator 10, which is connected to the combiner circuit 6, and from a Q code generator 12 which is connected to the combiner circuit 8. The outputs of the combiner circuits 6 and 8 are applied to a first input of a mixer circuit 14, 16. The mixer circuit 14, 16 has second input to receive an inphase and quadrature phase signal from a signal generator 18 which is fed from a carrier/convertor frequency oscillator 20. The outputs from the mixer circuits 14, 16 are passed through a combiner circuit 22 which is connected to other circuitry, such as a power amplifier or frequency conversion circuit. The code generators 10, 12 produce the spreading code at the chip rate while the bipolar modulating sequence operates at the bit rate. The ratio of these two values is equal to the spreading factor. Whenever pilot chips should be inserted, the switch is moved from position "S" (for Signal) to position "P" (for Pilot). Thus, when the switch 2 is in position P the spreading sequence is unmodulated. Thus, we can see that pilot chips can be inserted wherever required by suitable control of the switch 2.

Figure 2:
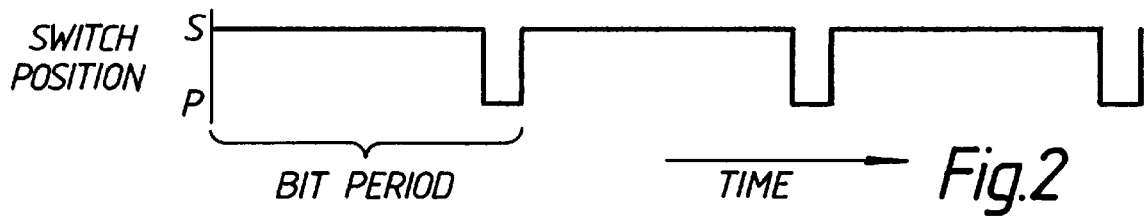
FIGS. 2, 3 and 4 show timing diagrams for chip insertion at different times during bit periods of the present invention.
Figure 3:
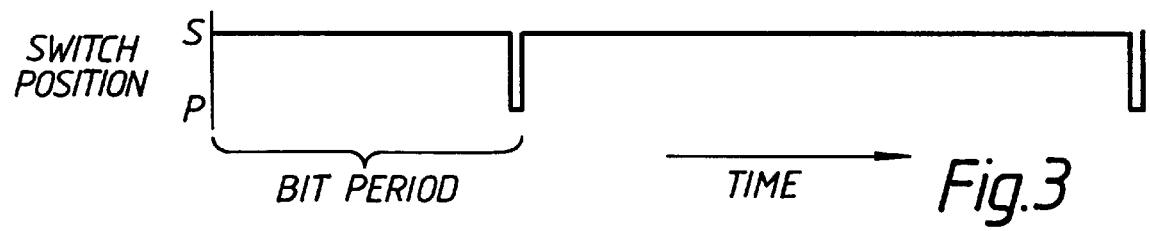

FIG. 2 shows the switch control positions for insertion of several pilot chips at the end of every bit. This is simplest, but by no means the only way of inserting pilot chips. For example, if pilot chips are only required infrequently (because the channel is changing very slowly), then FIG. 3 illustrates the case of inserting a pilot chip every other bit—effectively 0.5 pilot chips per bit.

Figure 4:
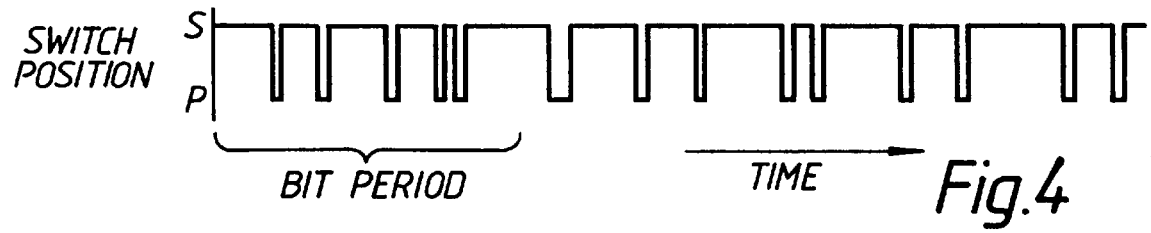

It is not even necessary to insert the pilot chips regularly within the bits. FIG. 4 illustrates the insertion of pilot chips in pseudo random positions. In fact the pilot sequence might be applied only to the I or only to the Q channel with an associated reduction in complexity.

The pseudo random sequence applied to the pilot sequence need not be part of the sequence used for data (as implied by FIG. 1). An entirely different sequence could be used although the former approach seems the simplest and no advantages can be seen for the latter.

In the receiver, it is necessary to de-spread the modulated and unmodulated chips separately. However, the process of multiplying by the code is identical. The only difference is that accumulated correlation values must be accumulated into different registers for the modulated and unmodulated chips.

Figure 5:
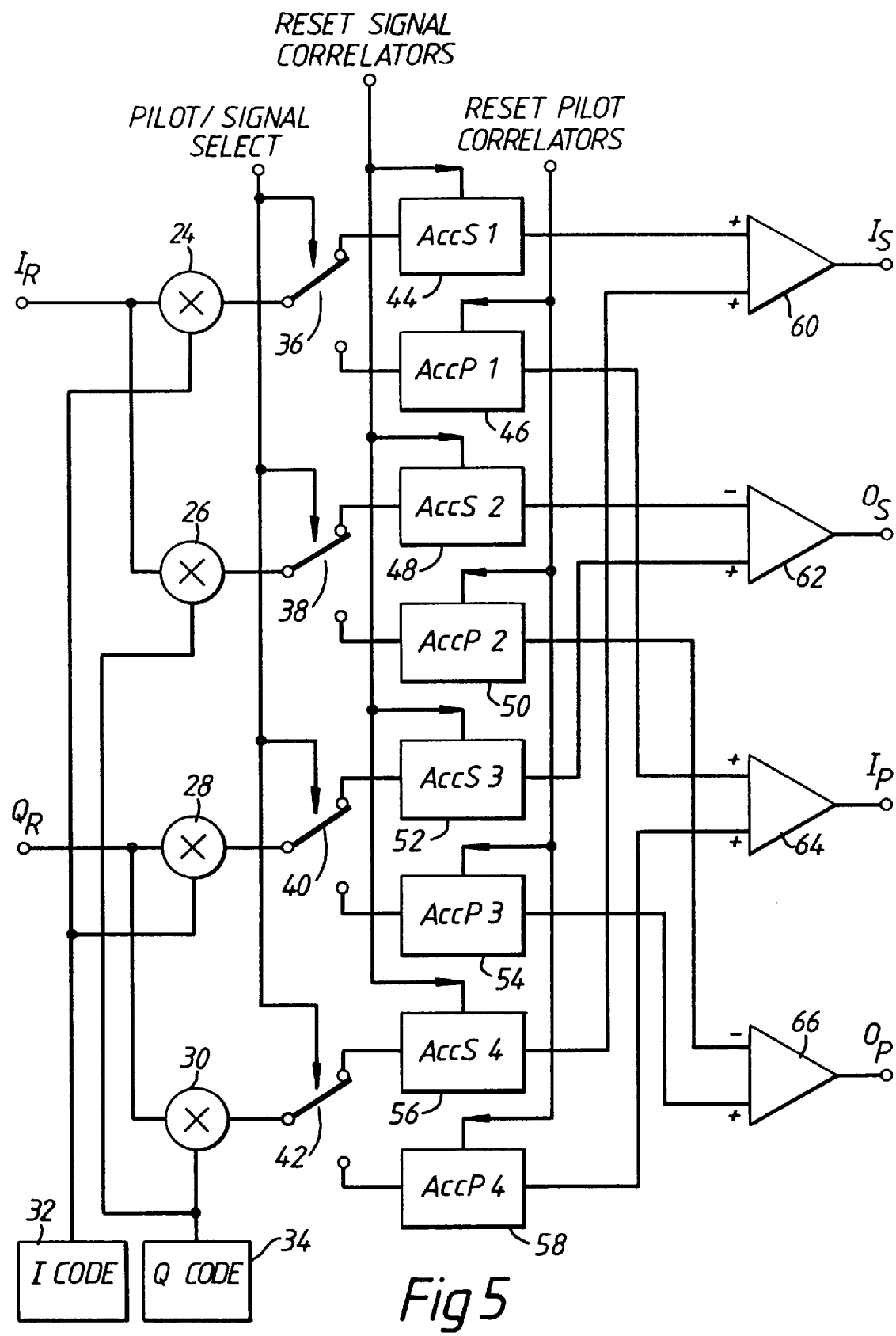
FIG. 5 is a diagram of pilot signal correlators of the present invention.

FIG. 5 illustrates a fully complex correlator architecture which outputs correlation values for both the modulated (signal) and unmodulated (pilot) components of the signal.

A correlator comprises a plurality of mixer circuits 24 to 30. The mixer circuits 24 and 26 have a first input to receive inphase signal IR, and a second input to receive the I code and Q code generated signals which are sent from the I code generator 32 and the Q code generator 34. The mixer circuits 28 and 30 have a first input to receive the quadrature phase signal component QR, and similarly a second input to receive the I code and Q code generator signals. The output from each mixer circuit is connected to an input of a switch 36, 38, 40, 42, which is controlled by a pilot/signal select line and is switchable between first and second positions connecting the output of the mixer circuit to an input of either an accumulator S1, 44 or an accumulator P1, 46. Similarly, the switch 38 is connected between the accumulator 48, 50. The switch 40 is connectable between accumulators 52, 54, and the switch 42 is connectable between accumulators 56, 58. The accumulators 44, 48, 52 and 56 are resettable via the signal correlator line, and the accumulators 46, 50, 54 and 58 are resettable via the pilot correlator line. The output of the accumulator 44 and the output of the accumulator 56 are connected to an input of a comparator 60 which generates an inphase signal IS at an output. The output of the accumulator 48 and the output of the accumulator 52 are connected to an input of a comparator 62, which generates a quadrature phase signal QS. The output of the accumulator 46 and the output of the accumulator circuit 58 are connected to an input of a comparator 64, which generates an inphase pilot signal IP. The output of the accumulator 50 and the output of the accumulator 54 is connected to an input of a comparator 66, which generates quadrature phase pilot signal QP.

The above described correlators operates as follows.

The presence of four correlators together with the various adders/subtractors is necessary for fully complex correlation as familiar to those versed in the art. Associated with each code multiplier is a pair of accumulators AccS N and AccP N, where N ranges from 1 to 4. The AccS accumulator accumulates the correlation score wherever the pilot/signal select line connects the switch to the upper contacts, whereas the AccP accumulator accumulates the correlation score whenever the pilot/signal select line connects the switch to the lower contacts. If the control of pilot/signal select line is synchronized to the corresponding switch position line in the modulator (as illustrated in FIGS. 2 to 4) then the AccS N will accumulate the signal correlation score and AccP N will accumulate the pilot correlation score.

Correlation values are obtained regularly by clearing the accumulators to zero. In the case of the pilot accumulators, resetting can be performed less frequently than the bit rate. This will produce correlation values which are averages over the pilot chips in several bits. Since averaging is required at a later stage, obtaining inherent averaging here can reduce the computational load in subsequent stages. Thus the lines for resetting the signal correlators and resetting the pilot correlators are shown as separate.

The operation of the receiver follows. The basic principle can be applied to any spread spectrum receiver, but sees its most general application in the so called Rake receiver. It will be appreciated that a basic spread spectrum receiver can be viewed as a single 'finger' Rake receiver.

The operation of the receiver is described here in terms of the 'Comprehensive Rake Receiver' of GB patent application No. 9316489.5, but it will be appreciated that the pilot chip technique can be applied to any basic Rake architecture using decision direction for carrier reference estimation.

Figure 6:
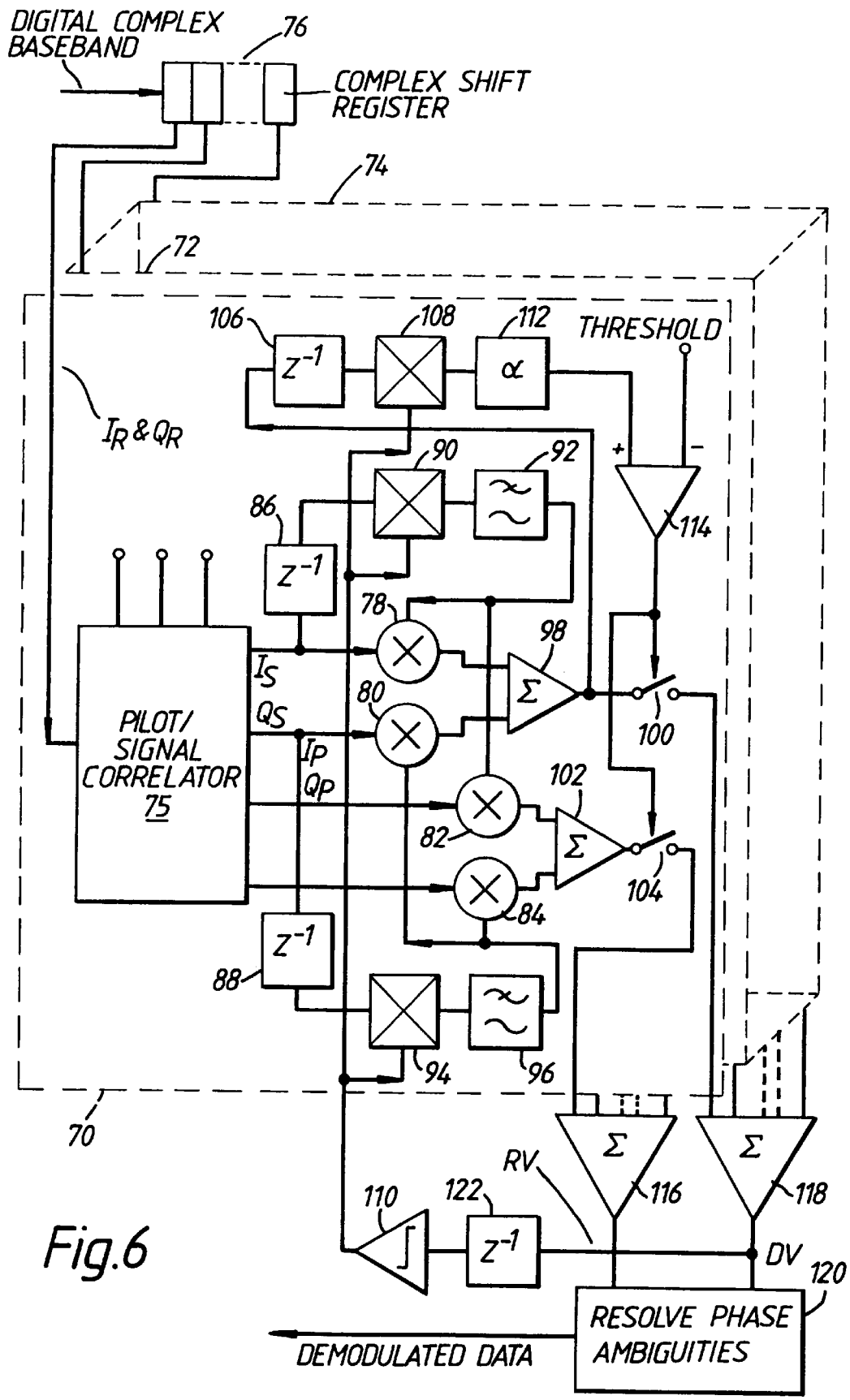
FIG. 6 shows a block diagram of a receiver of the present invention.

FIG. 6 shows a block diagram for a decision directed comprehensive Rake receiver, with pilot chip derived phase ambiguity resolution.

A basic receiver architecture consists of a complex shift register 56 which feeds into a plurality of Rake fingers 70, 72 and 74. Each Rake finger comprises a pilot/signal correlator 76 which generates the inphase and quadrature phase signals $I_s$, $Q_s$ and the inphase and quadrature phase pilot signals $I_p$, $Q_p$ which are applied respectively to an input of multiplying circuits 78, 80, 82 and 84. The inphase signal $I_s$ is also connected to a delay circuit 86 and the $Q_s$ signal is also connected to an input of a delay circuit 88. The output of the delay circuit 86 is connected to a multiplying circuit 90. The output of the multiplying circuit 90 is connected to a filter circuit 92. The output of the filter circuit 92 is connected to a further input of the multiplying circuit 78 and to a further input of the multiplying circuit 82. The output of the delay circuit 88 is connected to an input of a multiplying circuit 94. The output of the multiplying circuit 94 is connected to a filter circuit 96. The output of the filter circuit 96 is connected to a further input of a multiplying circuit 84 and to a further input of the multiplying circuit 80. The output of the multiplying circuits 78 and 80 are connected to an input of a summator 98. The output of the summator 98 is connected to a switch 100. The output from the multiplying circuit 82 and 84 are connected to an input of a summator 102. The output of the summator 102 is connected to a switch 104. The output of the summator 98 is also applied to an input of a delay circuit 106, the output of which is connected a multiplying circuit 108. The multiplying circuit 108 has a second input to receive an input from a limiting device 110. The output of the multiplying circuit 108 is connected to an alpha tracker circuit 112, the output of which is connected to a positive input of a comparator circuit 114. A negative input of the comparator circuit 114 has a threshold signal applied to it, and the output of the threshold circuit 114 is used to control the operation of the switches 100 and 104. When the switches 100 and 104 are closed, respective outputs from the summators 98 and 102 are applied to a respective summator 116 and 118. The summators 116, 118 also receive the signals from the other Rake fingers 72 and 74. The output from the summator 116 represents the resolution variable RV and is applied to a circuit 120 which is arranged to resolve phase ambiguities. The output of the summator circuit 118 represents a further variable described below which is also connected a further input of the circuit 120. The output of the summator 118 is also applied to a delay circuit 122. The output of the delay circuit 122 is connected to an input of the limiting device 110. The demodulated data is derived from an output of the circuit 120.

The operation of the receiver shown in FIG. 6 will now be described. The signal enters 1 complex shift register 76, after being sampled at one sample per chip and digitized at complex baseband. The taps of the shift register feed out to Rake fingers, spaced at one chip intervals. The operation of the first Rake finger 70, is described, although all Rake fingers operate identically. At the input of the Rake finger 70 is pilot/signal correlator 75, which has the functionality of FIG. 5. This is assumed to be controlled as required to differentiate between the times when signal and pilot chips are transmitted. The two outputs, $I_s$ and $Q_s$ provide the correlations for the signal. These are used in a decision directed fashion to obtain estimates of the channel. Each line feeds up (down) into a block labelled $Z^{-1}$, 86, 88, which implements a one bit delay. The delayed signal is then multiplied by multiplying circuit 90, 94 by the hard decision taken for that bit position in order to remove (at least in error free conditions) the modulation. The signal is then filtered, by filters 92, 96 to obtain a more accurate (noise/interference free) estimate of the channel conditions corresponding to The delay of that Rake finger, the filter 92 provides the inphase estimate, and the filter 96 provides the quadrature estimate. Each filter is nominally a one step predictor for the multipath fading process.

The estimates are then used to phase align the signal by the multiplying circuits 78, 80 and summator 98. The output of the summator 98 is a phase compensated, amplitude weighted version of the signal at the delay of the Rake finger, suitable for addition with corresponding outputs from the other Rake fingers. However, the signal is only in fact added in if the energy on that path is large enough that more signal than noise can be added. This is achieved by delaying the signal by delay circuit 106, and removing the modulation by circuit 108, and averaging with the alpha tracker circuit 112. The averaged power is then compared with a threshold by comparator 114, to determine whether the component should be included. When the output of the comparator is high, the switch 100 is closed and the output is fed to the summator 118. The output of the summator 118 is delayed by a delay circuit 122 and clipped by circuit 110, i.e. a decision taken, before feeding back to remove the modulation from the channel estimates.

So far, everything is as described in patent application GB 9316489.5. The additional elements relate to the use of the pilot information. The other outputs of the pilot/signal correlator, $I_p$ and $Q_p$ provide the correlations for the pilot. These are multiplied by circuits 82, 84 by the decision direction derived channels estimates and added together by the summator 102, in the same way as the signals Is and Qp,. However the rate of resetting the pilot correlators and performing the multiplication and addition operations may be less frequent than once per bit. The weighted and phase aligned pilot signals are then added together by the summator circuit 116 across the Rake fingers subject to the gating function applied by the switch 104.

Figure 7:
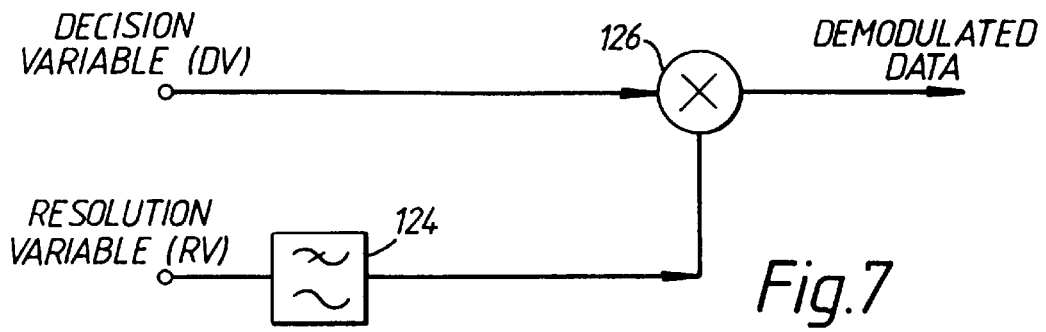
FIGS. 7, 8, 9 and 10 shows various diagrams of an ambiguity resolver, and of the present invention.
Figure 8:
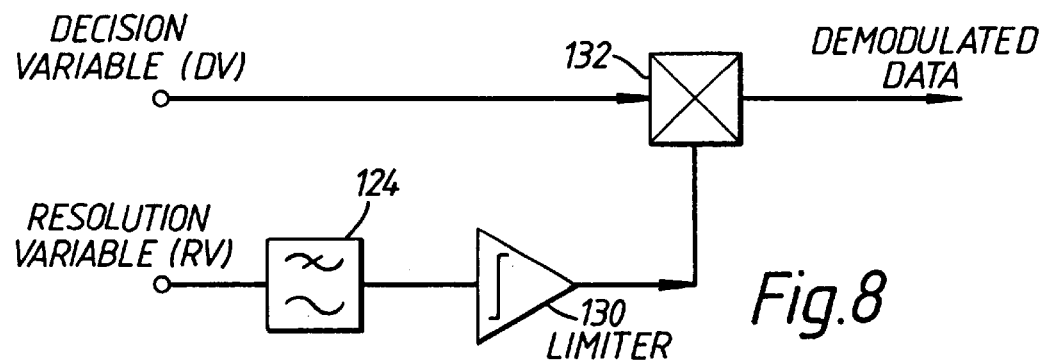

The output of the summator 116 (RV—for resolution variable) could be viewed as the decision variable DV for the pilot. However, it is known that the pilot was transmitted as a +1 so the sign of the decision variable DV should be consistent with this. If it is not, then clearly the channel estimates have become inverted. In this case, the decision variable DV for the data should be inverted to correct for the channel estimate inversion. This process is performed by the block labelled "Resolve Phase Ambiguities", 120. This block may have one of several implementations. The first is shown in FIG. 7, and similar elements bear the same designation in FIGS. 7 to 10.

The resolution variable RV is first filtered by the filter 124. This is important because the level of the pilot will in general be much too small to allow reliable decisions to be taken on the basis of individual bits. However, since the "bits" of the pilot are all +1, averaging can be performed. Indeed the pilot can be viewed as a repetition code, wherein averaging is equivalent to soft decision decoding. The averaged resolution variable is then simply multiplied with the decision variable by the multiplier 126 in order to resolve the phase ambiguities.

The above procedure performs a linear multiplication of the decision variable with the filtered resolution variable. The reliability of the resolution variable increases monotonically with its absolute value so that the above multiplication, to some extent, imposes this soft information on to the soft decision variable carrying the data. This may be expected to be beneficial when the data stream has had forward error correction coding applied and soft decision decoding is applied to the compensated decision variable. However, there may be circumstances in which hard decisions on the resolution variable are to be preferred. In this case the architecture of FIG. 8, could be used, wherein a limiter 130 is placed between its filter 124 and multiplier 132.

Figure 9:
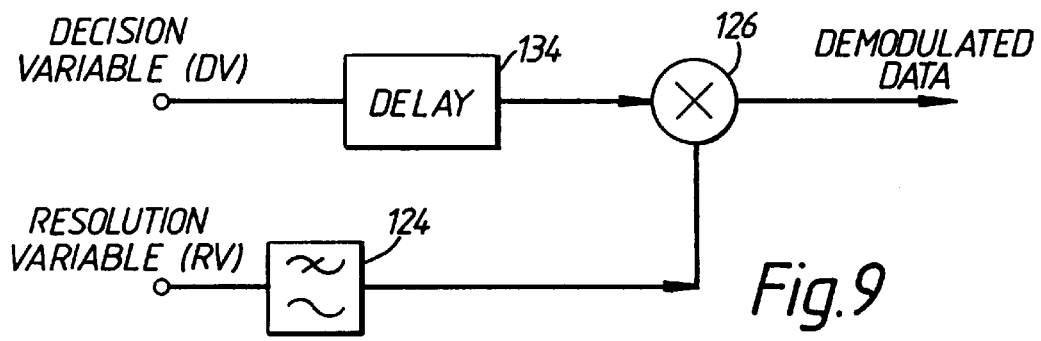

The use of the filter 124 alone above may be satisfactory for slow moving mobile units but at higher speeds there is the danger that the delay introduced by the filter will cause a zero crossing of the filtered resolution variable to be improperly timed with respect to the decision variable. This problem can be greatly mitigated by using a symmetrical filter (e.g.) a moving average filter) and inserting a compensating delay 134 into the decision variable path, as shown in FIG. 9.

Figure 10:
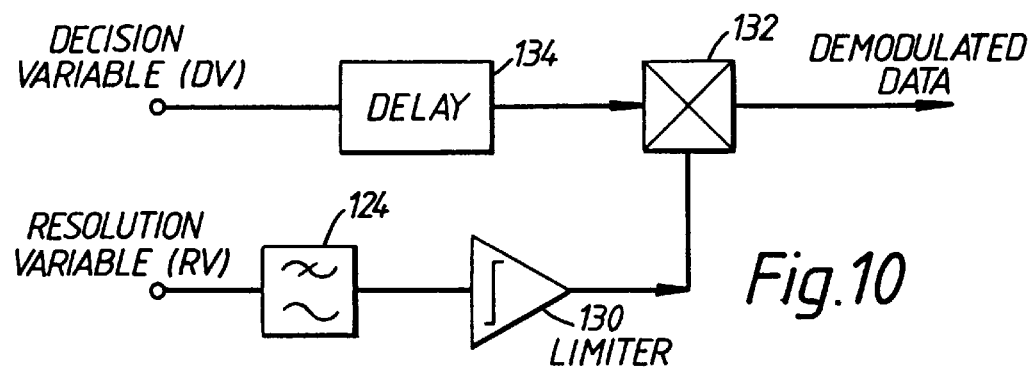

Obviously, in this case both options for excluding or including the limiter are available. This is shown in FIG. 10.

It should be noted in the above description that although it has been assumed that processing circuitry for the pilot chips is available in all Rake fingers, this is not essential. If circuitry were available for only a few Rake fingers this would only reduce the signal to noise ratio of the resolution variable by a few dB and would not significantly degrade performance. The available circuitry could be automatically assigned to the m Rake fingers, with the strongest signal components, where m is the number of processors available for the pilot chip signals.

Figure 11:
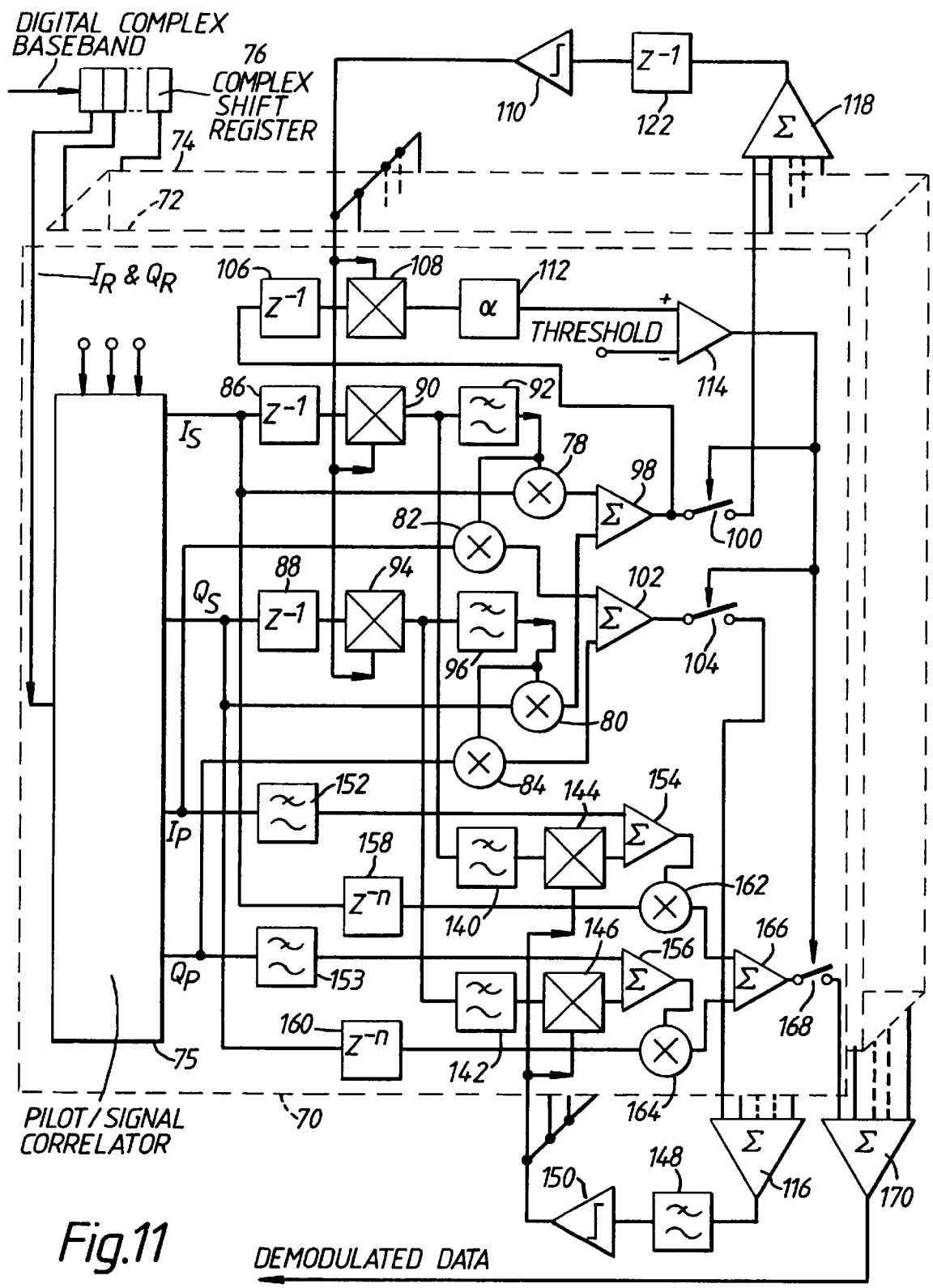
FIG. 11 shows a block diagram of a dual pass spread spectrum receiver of the present invention.

The operation of the pilot chip spread spectrum can be enhanced to work with the dual pass receiver of United Kingdom patent application No. 9317204.7. FIG. 11 shows a block diagram for the dual pass receiver.

The dual pass receiver architecture allows the presence of the pilot chips to improve the accuracy of the channel estimate. In the previous case, the decision directed channel estimate could not be combined with a pilot chip derived channel estimate because the former was subject to a 180 degree phase ambiguity. Thus the two estimates were as likely to cancel each other as to add together. In the case of the dual pass receiver, on the second pass the ambiguity resolution line can be used to remove the phase ambiguity, before the decision directed channel estimate is added to the pilot chip derived channel estimate. Operation of the system will now be described with reference to FIG. 11.

The first operations are identical to those described in FIG. 6. Many blocks are identical and connected in the same way as in FIG. 6, although the layout of the diagram been altered to accommodate the logic of the additional blocks. Thus identical blocks have been given the same designation. Thus, as before, the summator 118 provides a decision variable and the summator 116 provides a resolution variable. However the functionality of block 60 in FIG. 6 is replaced by the operations in the second pass. The signal paths $I_s$ and $Q_s$, have passed through delay circuits 86 and 88 and the modulation removers 90 and 94 to the predicting filters 92 and 96. In this implementation, the outputs of the modulation removers 90 and 94 also feed filters 140 and 142. These filters are non predictive, hence include a delay, but achieve more accurate estimation of the channel than the predictor filters 92 and 96. At this stage the channel estimates are subject to a phase ambiguity of 180 degrees due to the decision directed generation of the signal used to remove the modulation. However, the channel estimates at the outputs of multiplying circuits 144 and 146 apply after a delay. If an averaging filter 148 applied to the resolution variable has a similar delay, then the output of limiter 150 provides a timely steering signal for removal of the ambiguity.

Rather than remove the phase ambiguity from the second decision variable after it has been generated with a phase ambiguous channel estimate (as in FIG. 6), in this case the phase ambiguity is removed from the channel estimate(s) before it is applied to the signals. This is achieved by the multiplying circuits 144 and 146. Because the phase ambiguity has now been removed from the channel estimates it is now safe to add channel estimates derived from the pilot chips. Estimates are obtained by the filters 152 and 153 which have a similar delay to the filters 140 and 142 (and averaging filter 148). The estimates are then added together in summator circuits 154 and 156. Some (fixed) weighting may need to be applied in the adding of the estimates to ensure that the optimum improvement is achieved.

The improved channel estimates at the outputs of the summators 154 and 156 are now suitable for applying to the data. Since the filters have a delay of, say, n bits, same delay must be applied to the data. This is achieved by the "$Z^{-n}$" blocks, 158 and 160 which feed their outputs to multiplying circuit 162 and 164 followed by the summator 166 where 1 phase is compensated and the signal level, weighted.

Finally the output of the summator 166 is gated by 1 switch 168 before feeding to a Rake combiner 170. The output of the Rake combiner 170 provides the demodulated data in soft decision form.

It is likely that the optimum minimum delay for the filters 140 and 142 will be different from that for the filter 148. In this event it is assumed that the relevant additional delay will be incorporated into the filter(s) with the smaller delay, in order to match the delays overall.

The optimum proportion of the transmitted signal (number of chips per bit) given over to pilot transmission will vary as a function of the mobile speed and the general channel conditions. It can easily be seen that the approach detailed here lends itself well to automatic adaptation of the pilot energy. In a duplex link a feedback path is available from the receiver which can examine the characteristics of the signal and request an increase or decrease in the pilot level as required. It is a simple matter to alter the timing diagrams (as in FIGS. 2 to 4) in both the transmitter and the receiver as required. Note that the available bit rate is unaffected by the alteration in the pilot level so a constant service to the user can be maintained.

Although other modifications and changes may be suggested by those skilled in the art, it is the intention of the inventor to embody within the patent warranted hereon all changes and modifications as reasonably and properly come within the scope of his contribution to the art.

I claim:

1. A direct sequence spread spectrum modulation system comprising a transmitter and a receiver, said transmitter having a modulator, a switching means connected to an input of the modulator, the switching means having a first position and a second position for selecting in the first position a bipolar modulating data sequence to be applied to the modulator, and in the second position, pilot chips, and means for controlling the switching means connected to the switching means which operates in combination with said switching means to insert pilot chips into said modulating data sequence;

said receiver having means for despreading modulated data bits and unmodulated pilot chips separately, means for providing channel estimation, to facilitate demodulation and recovery of said data bits, and register means for accumulating correction values of the modulated data bits and unmodulated pilot chips into different registers, the accumulated unmodulated pilot chips serving to resolve phase ambiguity in said recovered data bits.

2. A system as claimed in claim 1, wherein the means for inserting a predetermined number of chips is constructed and arranged so that the pilot chips are inserted in psuedo random positions.

3. A system as claimed in claim 1, wherein the receiver is a Rake receiver.

4. A system as claimed in claim 1, wherein the receiver is a comprehensive Rake receiver.

5. A system as claimed in claim 1, wherein the receiver is a dual pass pilot spread spectrum receiver.

6. A system as claimed in claim 1, wherein the receiver includes resolving means for resolving phase ambiguities.

7. A system as claimed in claim 6, wherein the resolving means includes a filter for filtering a resolution variable, and a multiplier for multiplying a decision variable with the filtered resolution variable.

8. A system as claimed in claim 7, further comprising:

a hard limiting device arranged to allow the filtered resolution variable to pass therethrough.

9. A system as claimed in claim 7, further comprising:

a delay device arranged to allow the decision variable to pass therethrough.

* * * * *